(12) United States Patent
Tomita et al.

(10) Patent No.: US 7,706,966 B2
(45) Date of Patent: Apr. 27, 2010

(54) NAVIGATION SYSTEMS, METHODS, AND PROGRAMS

(75) Inventors: Hiroshi Tomita, Okazaki (JP); Kenji Nagase, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 420 days.

(21) Appl. No.: 11/640,318

(22) Filed: Dec. 18, 2006

(65) Prior Publication Data
US 2007/0150169 A1    Jun. 28, 2007

(30) Foreign Application Priority Data
Dec. 26, 2005    (JP)    .............................. 2005-373347

(51) Int. Cl.
*G08G 1/00*    (2006.01)
(52) U.S. Cl. ...................... 701/117; 701/118; 701/119; 701/200
(58) Field of Classification Search .................. 701/117, 701/118, 119, 300, 301, 207–213; 340/905, 340/995.11–995.14
See application file for complete search history.

(56) References Cited
U.S. PATENT DOCUMENTS
5,182,555 A    1/1993    Sumner1
7,383,126 B2 *    6/2008    Takahashi ................... 701/211
7,440,843 B2 *    10/2008    Yoshikawa et al. .......... 701/117
7,447,588 B1 *    11/2008    Xu et al. ...................... 701/117

FOREIGN PATENT DOCUMENTS
| EP | 1 288 885 A2 | 3/2003 |
| EP | 1 577 643 A1 | 9/2005 |
| JP | A 11-002538 | 1/1999 |

\* cited by examiner

*Primary Examiner*—Richard M. Camby
(74) *Attorney, Agent, or Firm*—Oliff & Berridge, PLC

(57) ABSTRACT

Vehicle navigation systems, methods, and programs, receive traffic information. The systems, methods, and programs determine whether there is a controlled road link within a predetermined distance of the vehicle and determine whether there is congestion information that begins with the controlled road link based on the received traffic information. The systems, methods, and programs provide, if the congestion information indicates that traffic congestion begins at the controlled link, guidance including traffic congestion guidance, the traffic congestion guidance indicating that the traffic congestion begins at the controlled road link.

14 Claims, 6 Drawing Sheets

NAVIGATION SYSTEMS, METHODS, AND PROGRAMS

INCORPORATION BY REFERENCE

The disclosure of Japanese Patent Application No. 2005-373347, filed on Dec. 26, 2005, including the specification, drawings and abstract is incorporated herein by reference in its entirety.

BACKGROUND

1. Related Technical Fields

Related technical fields include systems, methods, and programs that provide guidance based on traffic congestion.

2. Description of Related Art

In recent years, navigation apparatuses that carry out vehicle travel guidance and enable a driver to arrive at a desired destination easily are commonly mounted in vehicles. A navigation apparatus denotes an apparatus that detects the current position of a vehicle by using a GPS receiver or the like, and enables the displaying of map data that corresponds to the current position on a liquid crystal display. The map data is obtained from a recording medium such as a DVD-ROM, an HDD, or the like, or from a network. In addition, the map data that includes the current position of the vehicle is read from the recording medium, and a map image for the vicinity of the current position of the vehicle is rendered based on the map data and is displayed on a display apparatus. The map image may be displayed with a vehicle position mark superimposed thereon, and the location at which the vehicle is currently traveling can be recognized at a glance by scrolling the map image in association with the movement of the vehicle or moving the vehicle position mark over the map image that is held stationary on the screen.

In this context, various navigation apparatuses have been proposed in which the guidance route is based on received road traffic information and the congested congestion road links that are included along this guidance route are distinctly displayed.

For example, road traffic information is received externally and the congestion road links are distinctly displayed on the map. It is determined whether congestion road links are present along the guidance route based on the received road traffic information. In the case in which congestion road links are present, a display scale is determined that enables displaying the vehicle position and the endpoint of the congestion along the guidance route on one screen. At this scale, maps, the guidance routes, and the traffic congestion links are displayed (see, e.g., Japanese Patent Application Publication No. JP-A-11-2538).

SUMMARY

However, in the navigation apparatus disclosed in Japanese Patent Application Publication No. JP-A-11-2538, described above, if congestion road links are present along the guidance route based on the received road traffic information, it is possible to notify the driver about congestion along the guidance route by displaying in one screen a map that extends from the vehicle position to the end of the congestion or to subsequent locations after changing the reduced scale. However, the driver cannot easily grasp the cause of the congestion, that is, the type of traffic control (e.g., lane closures, construction, an accident, an event, etc.) that has caused the congestion, because the congestion information received as road traffic information is not associated with the traffic control information.

Thus, various exemplary implementations of the broad principles described herein provide a navigation apparatus that can provide recognizable guidance to a driver about the type of traffic control causing the traffic congestion when congestion road links are present along the guidance route.

Exemplary implementations provide systems, methods, and programs that may receive traffic information. The systems, methods, and programs may determine whether there is a controlled road link within a predetermined distance of a host vehicle and may determine whether there is congestion information that begins with the controlled road link based on the received traffic information. The systems, methods, and programs may provide, if the congestion information indicates that traffic congestion begins at the controlled link, guidance including traffic congestion guidance, the traffic congestion guidance indicating that the traffic congestion begins at the controlled road link.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Figure 1:
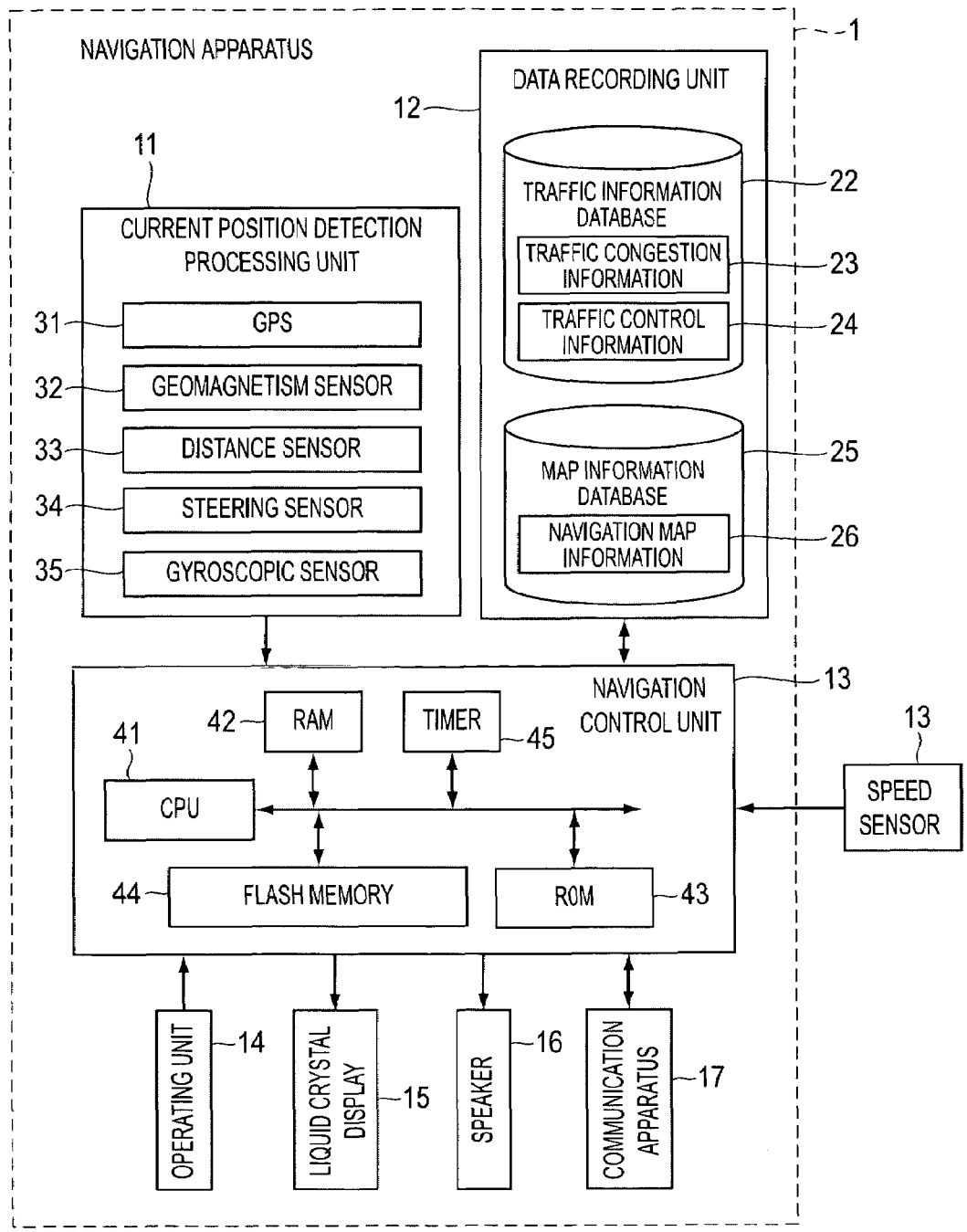
FIG. 1 is a block diagram showing an exemplary navigation apparatus.
Figure 2:
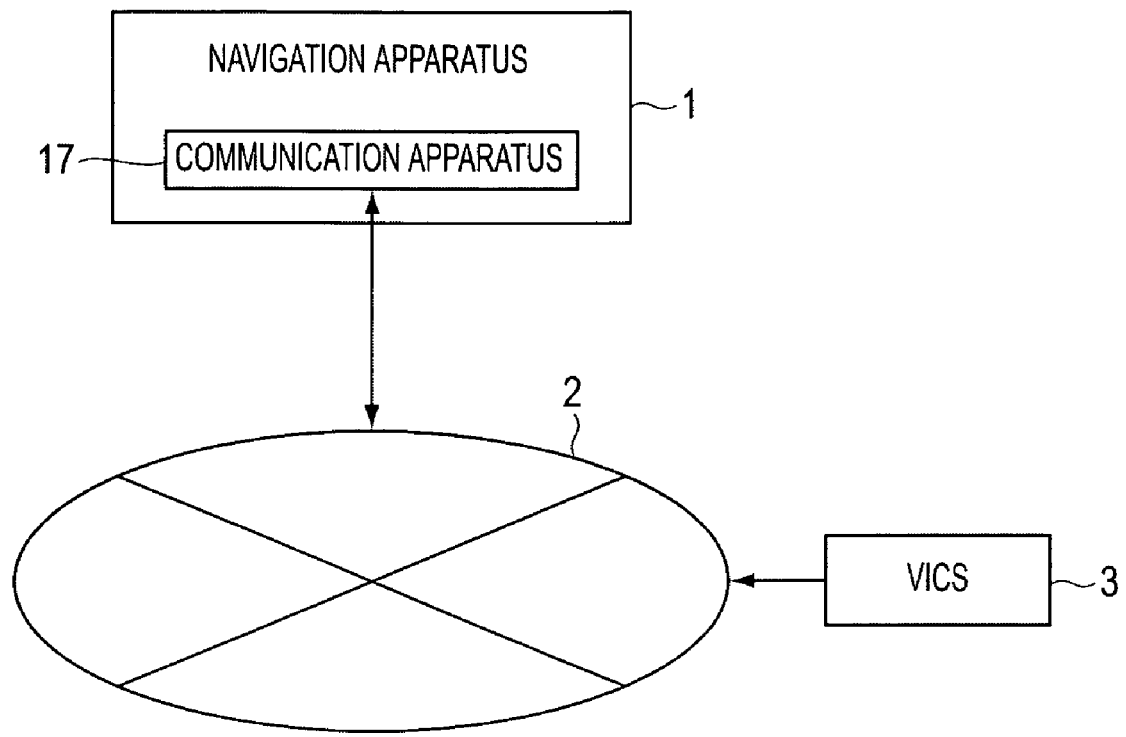
FIG. 2 is an explanatory drawing for explaining the communication between the exemplary navigation apparatus and a road traffic information center.

Hereinafter an exemplary navigation apparatus will be explained in detail with reference to the drawings. FIG. 1 is a block diagram showing a navigation apparatus 1. FIG. 2 is an explanatory figure for explaining the communication between the navigation apparatus 1 and a road traffic information center 3.

As shown in FIG. 1, the navigation apparatus 1 may include a current position detection processing unit 11 that detects the current position of the vehicle and a memory (data recording unit 12) in which various types of data are recorded. The navigation apparatus 1 may include a controller (navigation control unit 13) that, for example, carries out various types of arithmetic processing based on input information. The navigation apparatus 1 may include an operating unit 14 that receives operations from the operator, a liquid crystal display 15 that displays information such as maps to the operator, and a speaker 16 that outputs audio guidance related to the guidance route, traffic control information, and guidance about congestion information. The navigation apparatus 1 may include and a communication apparatus 17 that carries out communication with information centers such as, for example, the road traffic information center 3. In addition, a speed sensor 21 that detects the travel speed of the vehicle may be connected to the navigation control unit 13.

As shown in FIG. 2, the navigation apparatus 1 may be connected to the road traffic information center (e.g., VICS®: Vehicle Information and Communication System) 3 via a network 2. Additionally, the navigation apparatus 1 may be configured to receive at prescribed time intervals information related, for example, to congestion along the road and traffic information such as traffic control information. Such information may be produced by gathering information in the traffic control systems of the police, the Japan Highway Public Corporation, and the like, from the road traffic information center 3 via the network 2. In addition, this traffic information may be detailed information that relates to road congestion information about, for example, congestion along the roads, and traffic information for traffic control information that depends, for example, on road repairs, road construction, and the like.

In the case of road congestion information, the detailed information may include, for example, the VICS link IDs, which will be explained below, the actual length of the congestion, the expected time required for the congestion to clear up. In the case of traffic control information, the detailed information may include, for example, the VICS link IDs, the continuous period for road repairs and road construction, the types of traffic control, such as road closings, traffic restricted to one side of the street, lane control, the period of the traffic control, and the like.

Examples of communication systems that can be used as the network 2 include communication networks such as a LAN (Local Area Network), a WAN (Wide Area Network), an intranet, a mobile telephone network, a land line-telephone network, a public communication network, a dedicated communication network, and the Internet. In addition, it is possible to employ a communication system that uses broadcast satellites, such as CS broadcasting, BS broadcasting, digital terrestrial television broadcasting, FM multiplex broadcasting, and the like. Furthermore, it is possible to use a communication system such as the non-stop automatic toll payment system (ETC) that is used in an intelligent transport system (ITS) or a dedicated short-range communication (DSRC) system.

As shown in FIG. 1, the current position detection processing unit 11 may include a GPS 31, a geomagnetism sensor 32, a distance sensor 33, a steering sensor 34, a gyroscopic sensor 35 that functions as a bearing detecting unit, an altimeter (not illustrated), and the like, and may enable detecting the current position and the bearing of the vehicle, the distance to a landmark (for example, intersections), and the like.

Specifically, the GPS 31 may detect the current position of the vehicle on the surface of the earth and the current time by receiving radio waves generated by artificial earth satellites. The geomagnetism sensor 32 may detects the vehicle bearing by measuring geomagnetism. The distance sensor 33 may detect the distance between predetermined positions on the road and the like. In this context, as a distance sensor 33, it is possible to use, for example, a sensor that measures the revolution speed of the vehicle wheels (not illustrated) and detects the distance based on the measured revolution speed or a sensor that measures the acceleration and detects the distance by integrating the measured acceleration twice.

In addition, the steering sensor 34 may detect the steering angle of the vehicle. Here, an optical rotation sensor that is installed, for example, on the rotating portion of the steering wheel (not illustrated), a rotation resistance sensor, an angle sensor installed on the vehicle wheels, and the like can be used as the steering sensor 34.

The gyroscope sensor 35 may detect the turning angle of the vehicle. Here, for example, a gas rate gyroscope or a vibrating gyroscope or the like can be used as the gyroscope sensor 35. In addition, it is possible to detect the vehicle bearing by integrating the turning angle that has been detected by the gyroscope sensor 35.

The data recording unit 12 may be provided with a hard disk (not illustrated) that serves as an external memory apparatus and a recording medium, and a recording head (not illustrated), which is a driver for reading a traffic information DB 22, a map information DB 25, and predetermined programs and the like that may be recorded on the hard disk, and for writing predetermined data onto the hard disk. Note that in the present example, although a hard disk may be used as the external memory apparatus and the recording medium for the data recording unit 12, it is also possible to use a magnetic disk such as a flexible disk, a memory card, magnetic tape, a magnetic drum, a CD, a MD, a DVD, an optical disk, a MO, an IC card, an optical card and/or the like as the external memory apparatus.

Congestion information 23 that is received from the road traffic information center (VICS) 3, and the like are stored in the traffic information DB 22. Such congestion information may be produced from traffic information related to a current state of the road congestion formed from the actual length of congestion and the expected time for the congestion to clear up. In addition, traffic control information 24 may be stored in this traffic information DB 22. The traffic control information 24 may be produced from traffic information that is received from the road traffic information center (VICS) 3, and may relate to traffic control information and the like that depends on road repairs, road construction and the like, which are subject to traffic control.

In addition, congestion classification information, information about the congestion position, information about the distance between the congested segments, information about the degree of the congestion and the like may be included along with VICS link IDs in the traffic information received from the road traffic information center (VICS) 3.

As used herein, the term "link" refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes. As used herein the term "node" refers to a point connecting two links. A node may be, for example, an intersection, an intersection having more than three roads, a curve, and/or a point at which the road type changes.

A VICS link ID is an identification number appended to the VICS links as standardized travel guidance links by partitioning roads at certain predetermined intersections. Note that information such as the coordinates of the origin and termination in each of the VICS links, the distances between origins and terminals, and the like, are included in the traffic information.

Here, links and the VICS links that are stored in the map information DB 25 are not identical. Generally, links are more detailed than the VICS links. Thus, a conversion table for converting between link IDs and the VICS link IDs, which are appended to each link as an identification number, may be included in the traffic information DB 22. Thus, it is possible to specify the associated link IDs based on the VICS link IDs.

Based on the conversion table, when a VICS link ID is received from the road traffic information center 3, the navigation apparatus 1 can specify the segment of the road for which road traffic information about congestion and the like should be displayed based on the VICS link ID. In addition, the VICS link ID for the road traffic information related to current road congestion and the like that is received from the road traffic information center 3 may be converted to a link ID and stored as congestion information 23. A VICS link ID for road traffic information related to traffic control information and the like that is received from the road traffic information center 3 may be converted to a link ID and stored as traffic control information 24.

Navigation map information 26 that may be used in the travel guidance and route searches for the navigation apparatus 1 may be stored in the map information DB 25. Here, the navigation map information 26 may be configured by various types of information necessary for the route guidance and map display. The navigation map information 26 may be configured, for example, by new road information that specifies new roads, map display data for displaying maps, intersection data related to each intersection, node data for node points, link data related to links, facility data, search data for searching for routes, data related to a POI (Point of Interest) for pints of interest, and search data for searching for locations and the like. In addition, the content of the map information DB 25 may be updated by downloading updated information that is distributed via a communication apparatus 17 from the map information distribution center (not illustrated).

The map display data may be configured based on a mesh that is partitioned, for example, into 10 km by 10 km sections, and it is configured in units partitioned into 4 partitions (length: ½), 16 partitions (¼), or 64 partitions (⅛), and the units for each location may be set such that the data amount in each unit is at substantially the same level. The 64-partition sized unit, which is the smallest, may have a size equivalent to an approximately 1.25 km square.

Node data may include, for example, junctions for actual roads (including intersections, T intersections and the like); coordinates (positions) of node points that are set in each road at prescribed distances depending on the radius of curvature; node attributes that show, for example, whether a node is a node that is associated with an intersection; a connecting link number list that is a list of link IDs, which are identification numbers for links connected to a node; an adjacent node number list, which is a list of node numbers of nodes that are adjacent to a node via a link, the height (altitude) of each node point, and the like.

Link data may include data that relates to each link that forms a road. Examples of link data include data that represents the width of the road that is included in a link, inclination, cant, banking, the condition of the road surface, the number of lanes in the road, locations where the number of lanes decreases, locations where the road narrows, railroad crossings, and the like. Examples of link data include data that represents, in relation to corners, the radius of curvature, intersections, T intersections, entrances and exits at corners and the like. Examples of link data include data that, in relation to road attributes, represents upward and downward slopes and the like. Examples of link data include data that, in relation to road types, represents, in addition to general roads such as national roads, prefectural roads, local streets, and the like, represents national expressway, urban expressway, toll roads such as general toll roads and toll bridges and the like. Furthermore, in relation to toll roads, data related, for example, to the access roads (ramp ways) of the entrances and exits to the toll roads, toll booths (interchanges), and the like, may be included as link data.

Search data may include data that is used when searching for and displaying a route up to a set destination, and may be formed by cost data that is used to calculate search costs. Search costs may include a "cost" associated with traveling the various nodes and links. For example, the higher a cost for a particular link or node, the less desirable that link or node will be to travel. Thus, links and nodes with high costs are less likely to be included in a recommend route. Search data may include route display data for displaying the guidance route that has been selected by the route search on a map in the liquid crystal display 15.

POI data such as data related to hotels, hospitals, gasoline stations, parking lots, and tourist facilities in each area may be recorded along with an ID that specifies the POI. Note that audio output data for outputting audio information by the speaker 16 of the navigation apparatus 1 may also be recorded in the map information DB 25.

In addition, as shown in FIG. 1, the navigation control unit 13 may include, for example, a CPU 41 that serves as an arithmetic apparatus and a control apparatus that may carry out overall control of the navigation apparatus 1. The navigation control unit 13 may include a RAM 42 that may be used as working memory when the CPU 41 carries out various arithmetic processes and at the same time may record route data for routes that have been searched and link IDs in which the traffic control information is present. The navigation control unit 13 may include a ROM 43 that may record, in addition to control programs, a congestion information guidance process program that provides guidance about congestion information based on traffic control information. The navigation control unit 13 may include an internal memory apparatus such as flash memory 44 that stores programs that have been read from the ROM 43, a timer 45 that measures time, and the like. Note that a semiconductor memory, electromagnetic core and the like may be used as the RAM 43, ROM 43, and the flash memory 44. In addition, instead of the CPU 41, an MPU and the like can be used as the arithmetic apparatus and the control apparatus.

Various programs may be stored in the ROM 43 and various types of data may be stored in the data memory unit 12. Programs, data, and the like may be written to the flash memory 44 after reading the programs and data from similar external memory apparatuses, memory cards, and the like. Furthermore, it is possible to update the programs and data by replacing a memory card and the like.

An operating unit 14, a liquid crystal display 15, a speaker 16, and various peripheral devices (actuators) for the communication apparatus 17 may be electrically connected to the navigation control unit 13.

The operating unit 14 may be operated, for example, when the present position at the start of the travel is corrected, when a departure point is input as the guidance starting point, and/or when the destination is input as the guidance end point. The operating unit 14 may be operated when carrying out a search of information related to facilities. The operating unit 14 may be constructed by a plurality of operating switches such as various types of keys. The navigation control unit 13 may carry out control in which various associated actions are executed based on the switch signals output by pressing each of the switches down. Note that a keyboard, a mouse, a barcode reader, a remote control apparatus for remote control, a joystick, a light pen, a stylus or the like can be used as the operating unit 14. Furthermore, the operating unit 14 can be constructed by a touch panel provided at the front of the liquid crystal display 15.

Operating guidance, an operating menu, key guidance, a guidance route from the current position to the destination, guidance information along the guidance route, traffic information, news, weather reports, time, mail, television programs and the like may be displayed on the liquid crystal display 15. Note that instead of the liquid crystal display 15, a CRT display, a plasma display or the like can be used. Also a hologram apparatus that projects a hologram onto the front windshield glass of the vehicle can be used.

The speaker 16 may output audio guidance that provides guidance about travel along the guidance route, for example, based on instructions from the navigation control unit 23. The speaker 16 may output audio guidance that provides guidance about congestion information based on the traffic control information. Examples of audio guidance for providing guidance include "In 200 m, turn right at intersection X" and "Ahead, due to lane control, there is congestion for about 3 km." Note that in addition to a synthesized voice, it is possible to output various sound effects or various types of guidance information recorded in advance on tape, in memory, or the like as audio that is to be output from the speaker 16.

The communication apparatus 17 may be a beacon receiver that receives signals from a radio beacon apparatus installed along the road, an optical beacon apparatus installed along the road, or the like. The communication apparatus 17 may receive road traffic information including congestion information, traffic control information, parking lot information, traffic accident information, information about the crowding conditions at service areas and the like that have been sent from, for example, from the road traffic information center 3. In addition, the communication apparatus 17 may enable communication over networks such as a LAN, WAN, intranet, a mobile cell network, a landline telephone network, a public communication network, a dedicated communication network, and a communication network such as the Internet that may serve as the network 2.

In addition to information from the road traffic information center 3, the communication apparatus 17 may be provided with an FM receiver that receives FM multiplex information that includes information such as news, weather reports and the like via an FM broadcast radio station as an FM multiplexed broadcast. Note that the beacon receiver and the FM receiver are integrated and mounted in the VICS receiver, but they may be installed separately.

Next, an exemplary guidance method will be described with reference to FIGS. 3-6. The exemplary method may be implemented, for example, by one or more components of the above-described apparatus. However, even though the exemplary structure of the above-described apparatus may be referenced in the description, it should be appreciated that the structure is exemplary and the exemplary method need not be limited by any of the above-described exemplary structure.

Figure 3:
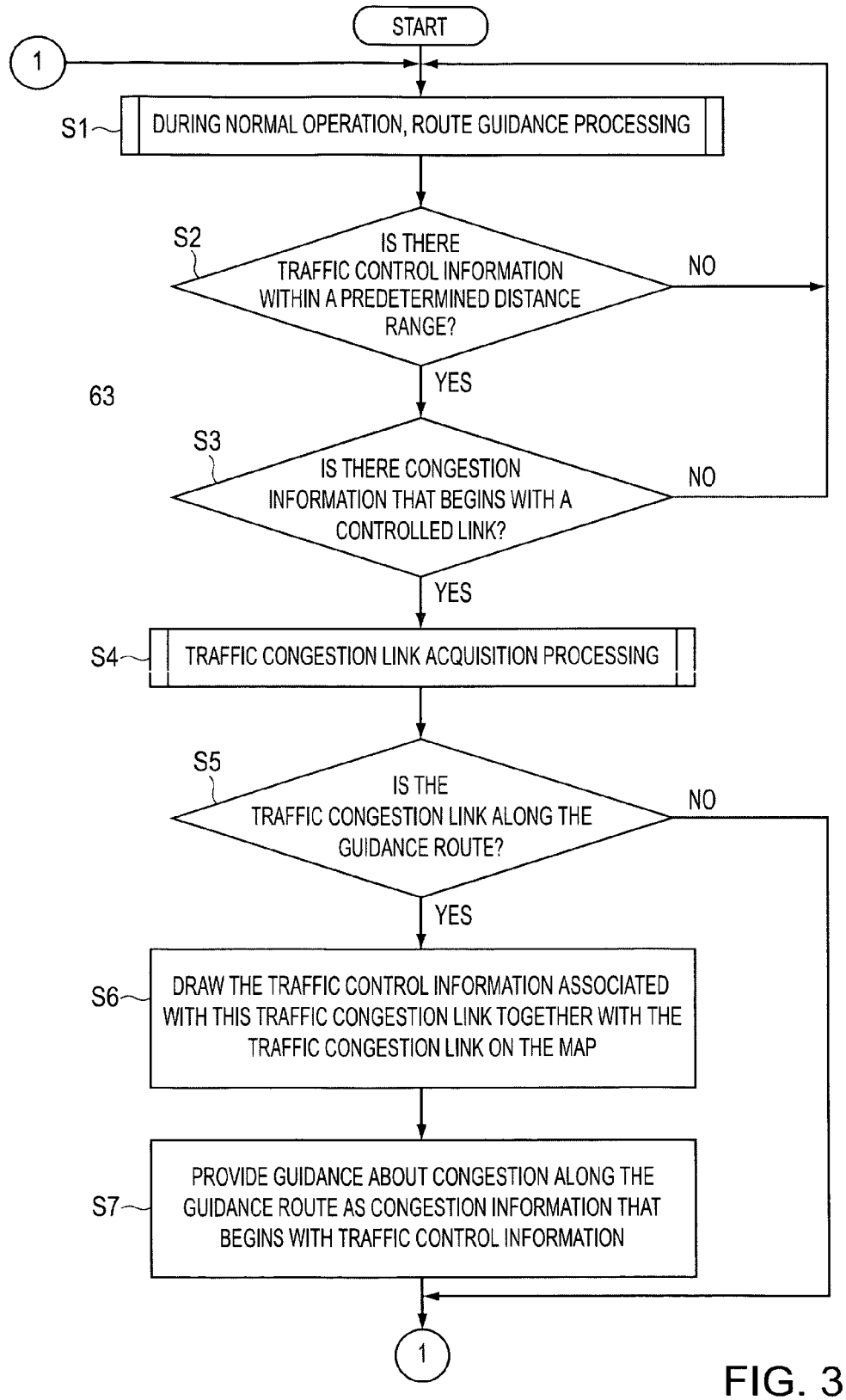
FIG. 3 shows an exemplary congestion information guidance method.

As shown in FIG. 3, first, in step 1 (below, step is abbreviated "S"), normal route guidance is performed. That is, for example, the CPU 41 detects the vehicle position by using the current position detection processing unit 11, reads the map data that includes this vehicle position from the navigation map information 26, draws a map image 50 (refer to FIG. 6) of the vicinity of the vehicle position based on the map data, and displays the same in the liquid crystal display 15. At the same time, the CPU 41 superimposes and displays a vehicle mark 51 (refer to FIG. 6) that shows the vehicle position on the map image 50, and displays the current position at which the vehicle is traveling so that it may be understood at a glance by scrolling the map image according to the movement of the vehicle or holding the map image 50 stationary in the screen and moving the vehicle position mark 51. In addition, the CPU 41 carries out the display by changing the display state such that the guidance route 54 up to a destination 53 is visually distinguished from the other roads on the map image 50. Note that the CPU 41 executes the processing in S1 every 30 seconds to 3 minutes, and then executes the processing in S2 and after.

Next, in S2, it is determined whether there is traffic control information. That is, for example, the CPU 41 reads traffic control information 24 of the traffic information DB 22, and executes determination processing that determines whether there is traffic control information 24 about road repairs, road construction, or traffic limited to one lane due to a traffic accident and the like that are present within a range of a predetermined distance (e.g., about 10 km to 50 km) from the vehicle position. If there is no traffic control information 24 that is present within a range of a predetermined distance (about 10 km to 50 km) from the vehicle position (S2: NO), operation returns to S1.

Figure 6:
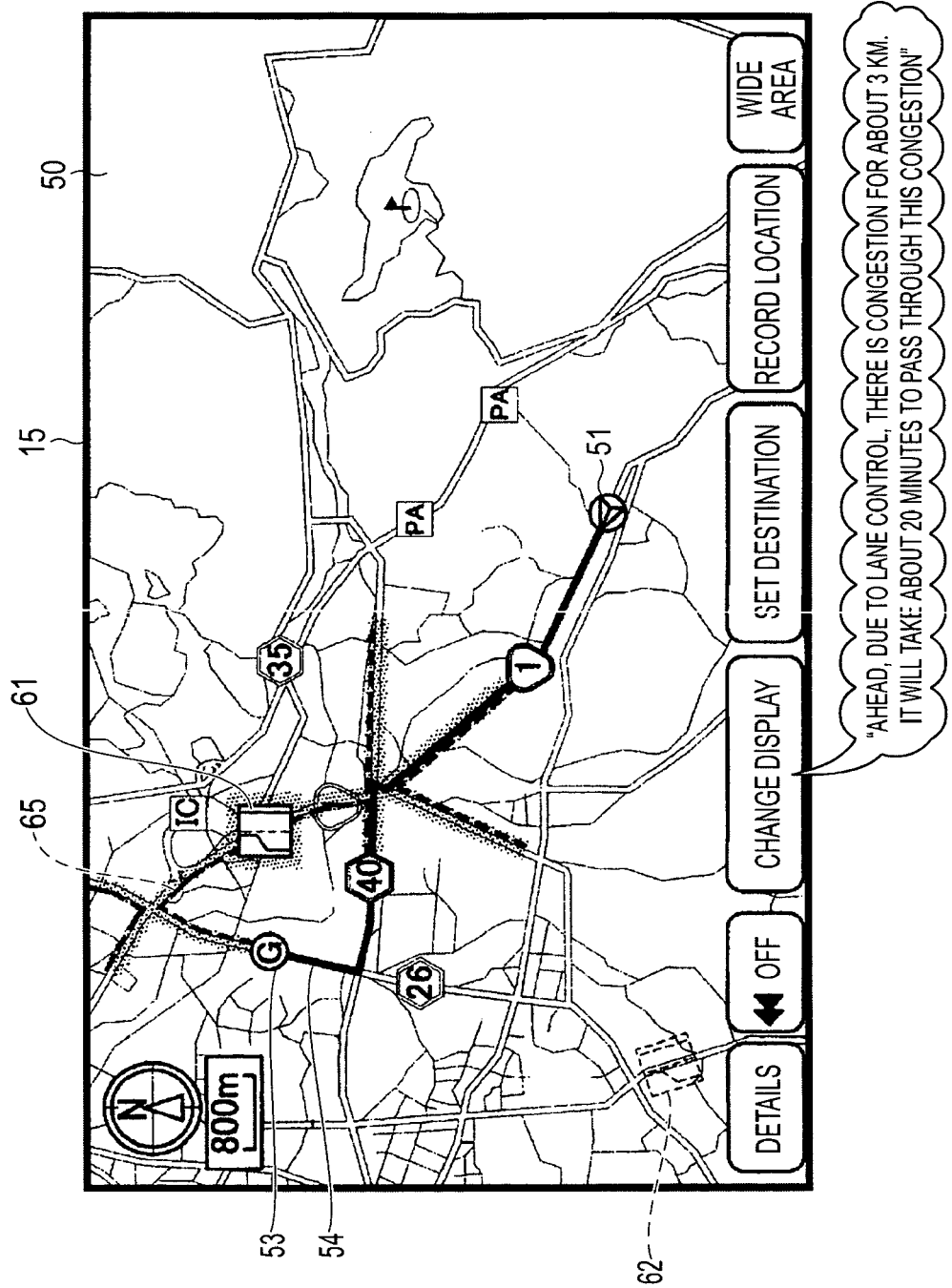
FIG. 6 is a drawing showing an exemplary display screen and congestion guidance message.

In contrast, for example, as shown in FIG. 6, if there is traffic control information 61 and 62 present within a range of a predetermined distance from the vehicle position (S2: YES), operation continues to S3. In S3, it is determined whether there is congestion information that begins with a controlled link. That, is, for the traffic control information 61 and 62 that is present within a range of a predetermined distance from the vehicle, the CPU 41 may execute determination processing that determines whether there is congestion information 23 that begins with each link in which the traffic control information 61 and 62 are present. Specifically, the CPU 41 executes determination processing that determines whether there is congestion information 23 in which the link ID where the congestion starts is a link ID that is identical to a controlled link.

Next, if there is no congestion information 23 in which the traffic congestion link begins with a controlled link (S3: NO), operation returns to S1. AS shown by way of example in FIG. 5, if there is congestion information 72 (shown by the broken line) in which the traffic congestion link R1 where the congestion starts is identical to a controlled link R1 in which traffic control information 70 is present (S3: YES), in S4, traffic congestion links are acquired. That is, for example, the CPU 41 may execute sub-processing of the "traffic congestion link acquisition processing" according to the method shown in FIG. 4.

Figure 4:
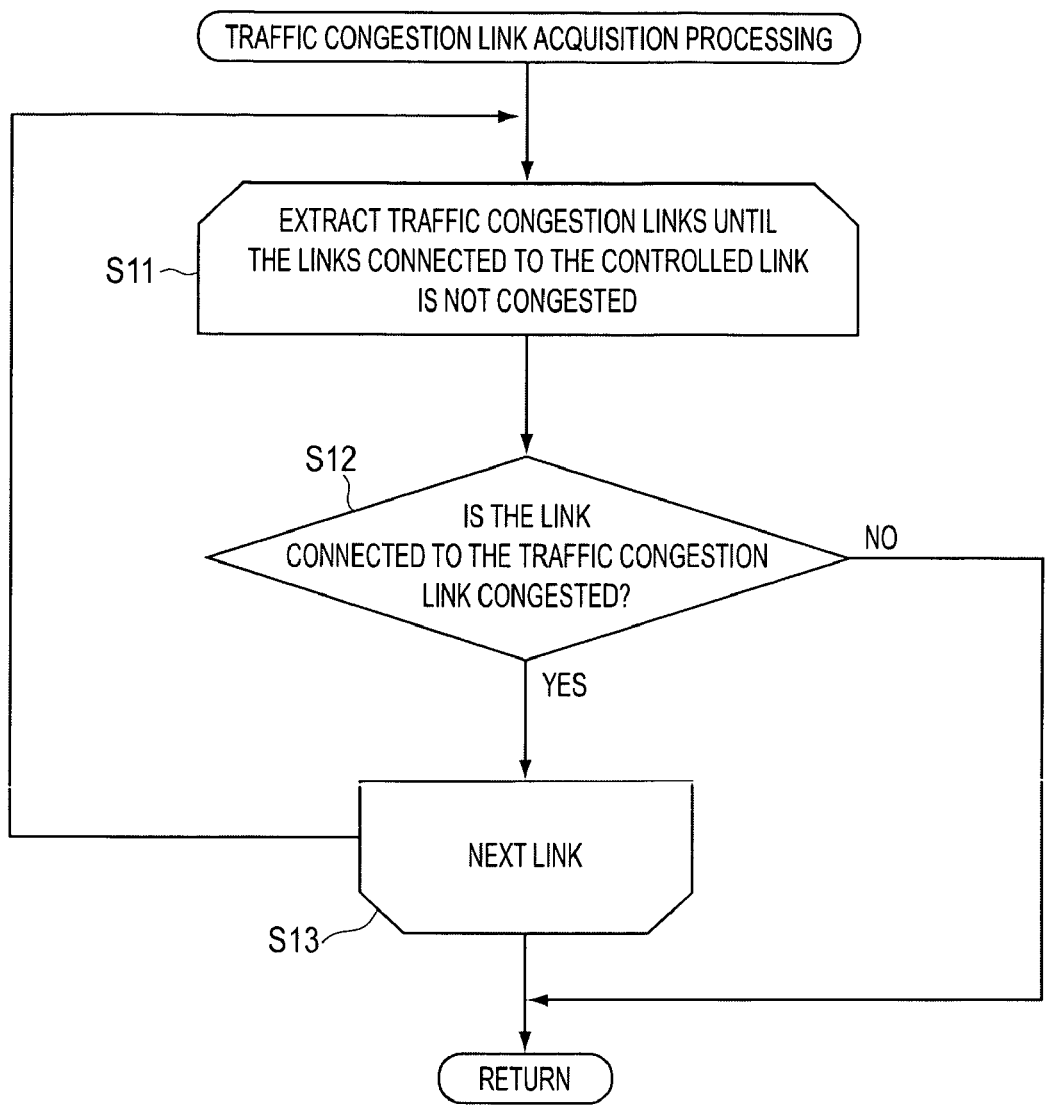
FIG. 4 shows an exemplary congestion link acquisition method.

As shown by the processing loop in FIG. 4, in S11, a traffic congestion link is extracted. For example, the CPU 41 extracts a traffic congestion links. Then it is determined for the extracted link, in S12, whether the link is congested. For example, the CPU 41 executes determination processing in which it is determined whether the link extracted in S11 is a traffic congestion link. When the extracted link is not congested (S12: NO) it is determined that all of the traffic congestion links have been extracted, an operation returns to S5. Otherwise the loop continues, extracting congested links that are connected to one another, beginning with the control link determined in S3.

Note that if the subsequent links in S13 are all links outside the range of a predetermined distance (e.g., about 50 to 60 km) from the vehicle position, the loop may be ended.

Figure 5:
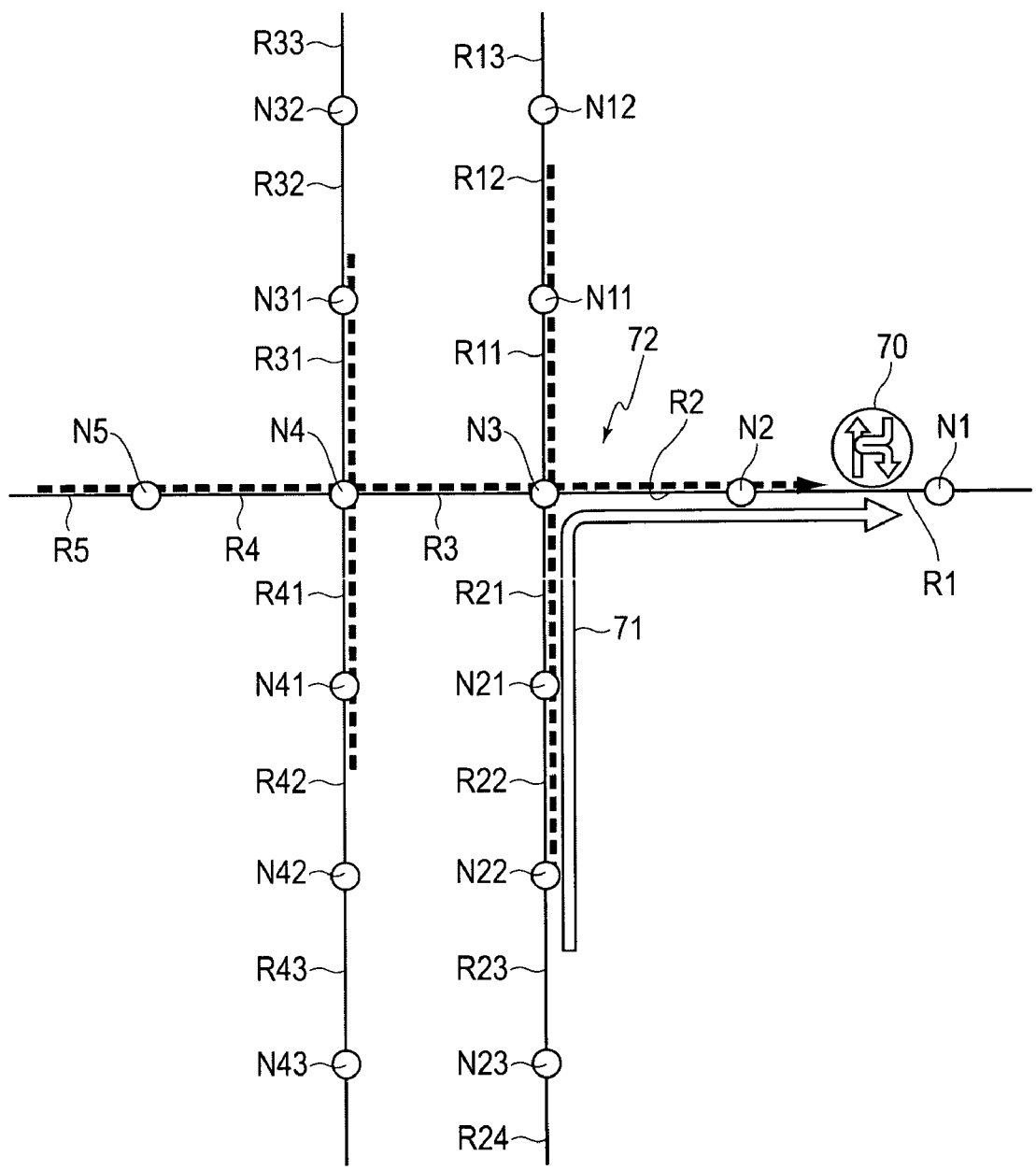
FIG. 5 is an explanatory drawing of map information.

For example, as shown in FIG. 5, the CPU 41 may extract the traffic congestion link R1 that is identical to the controlled link R1 (in S3), the traffic congestion links R2 to R5 (in S11-S13), which are connected to the node N2, the traffic congestion links R11 and R12 (in S11-S13) and the traffic congestion links R21 and R22 (in S11-S13) that are connected to node N3, and the traffic congestion links R31 and R32 (in S11-S13) and the traffic congestion links R41 and R42 (in S11-S13) that are connected to node N4, and may store these links in the RAM 42 as the traffic congestion links of the congestion information 72 that begins with the controlled link R1 in which traffic control information 70 is present.

Next, in S5, it is determined if a traffic congestion link is along the guidance route. That is, for example, the CPU 41 executes a determination processing in which it is determined whether one or more of the traffic congestion links that have been extracted in S4 are along the guidance route. Then, if the traffic congestion links extracted in S4 are not along the guidance route (S5: NO), operation returns to S1. If the traffic congestion links that were extracted in S4 are along the guidance route, or specifically, if traffic congestion links included in the guidance route are present among these extracted traffic congestion links (S5: YES), operation continues to S6. For example, as shown in FIG. 5, if the traffic congestion links R1, R2, R21, and R22 among the traffic congestion links R1 to R42 of the congestion information 72 that begins with the controlled link R1 are along the guidance route 71, or specifically, if the traffic congestion links R1, R2, R12, and R22 are included in the links that form the guidance route 71 (S5: YES), the CPU 41 moves to the processing in S6.

Next, in S6, for example, the CPU 41 may distinctly display the traffic control information 24 that is associated with the traffic congestion links that were extracted in S4 and the traffic congestion links that form the congestion information 23 that begins with this traffic control information 24 in the map image 50 of the liquid crystal display 15. In addition, in S7, the CPU 41 may provide audio guidance about the congestion along the guidance route via the speaker 16 as congestion information 23 that begins with the traffic control information 24 that is associated with the traffic congestion links that were extracted in S4. Operation of the method returns to S1, for example, after a predetermined time interval (e.g., about 1-3 minutes) has passed.

Thus, for example, as shown in FIG. 6, traffic control information 61 that shows lane control may be displayed by flashing in the map image 50 on the liquid crystal display 15, and at the same time, the traffic congestion links that form the congestion information 65 that begins with this traffic control information 61 may be displayed by a flashing red broken line. In addition, a guidance route 54, which connects the vehicle position mark 51, showing the vehicle position, and the destination 53, may be displayed, for example, as a colored bold line. If, for example, the total distance of the traffic congestion links along the guidance route 54 is 3 km, and the vehicle speed is about 150 m/minute, audio guidance stating "Ahead, due to lane control, there is congestion for about 3 km. It will take about 20 minutes to pass through this congestion" may be provided via the speaker 16. Note that because there is no congestion information 23 that begins with the traffic control information 62, the traffic control information 62 is not displayed.

According to the above example, if there is traffic control information 24 within the range of a predetermined distance from the vehicle position and there is congestion information 23 in which the traffic congestion link R1 where the congestion begins is identical to the controlled link R1 in which the traffic control information 24 is present, the traffic congestion links that form the congestion information 23 may be extracted. Then, if there are traffic congestion links along the guidance route among these extracted traffic congestion links, the CPU 41 may distinctly display the traffic control information 24 that is associated with the traffic congestion links and the congestion information 23 that begins with this traffic control information 24 on the map of the liquid crystal display 15. At the same time audio guidance about the congestion along the guidance route may be provided via the speaker 16 as congestion information 23 that begins with this traffic control information 24.

Because the guidance about the congestion is provided as congestion information 23 that begins with the traffic control information 24, the user can easily grasp the cause of the congestion along the guidance route, or specifically, what kind of traffic control information 24 has caused the congestion. In addition, because the traffic control information 24 that is associated with the traffic congestion links and the congestion information 23 that begins with this traffic control information 24 are distinctly displayed in the map image 50 on the liquid crystal display 15, the user can easily decide on a detour for detouring around this congestion.

In S4, all the traffic congestion links that are connected to a controlled link in which traffic control information are extracted. If, in S5, there are extracted traffic congestion links included along the guidance route, it is possible to determine correctly the congestion along the guidance route as congestion information that begins with traffic control information.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, in FIG. 6, the traffic control information 62 is not displayed because there is no congestion information 23, but all of the traffic control information 24 within a predetermined range from the vehicle position may be displayed. Thereby, it is possible to determine more easily a detour for detouring around the congestion.

In addition, in FIG. 6, in the identical reduced display in the map image 50 that displays the guidance route 54, if the traffic control information 61 that is associated with the traffic congestion links along the guidance route 54 cannot be displayed, this traffic control information 61 is not displayed and thus only audio guidance about the traffic control information 24 may be provided by the speaker 16. Thereby, it is possible to confirm easily that the congestion of the guidance route 54 is congestion that begins with the traffic control information 61.

In addition, in FIG. 6, in the identical reduced scale display in the map image 50 that displays the guidance route 54, if the traffic control information 61 that is associated with the traffic congestion links along the guidance route 54 is not displayed, the traffic control information 61 may be displayed superimposed on the congestion information 65 in the peripheral portion of the display screen. Thereby, it is possible to confirm more easily that the congestion of the guidance route 54 is congestion that begins with the traffic control information 61.

What is claimed is:

1. A navigation apparatus for a vehicle, the apparatus comprising:
   a communication portion that receives traffic information including congestion information and traffic control information; and
   a controller that:
      determines whether there is a controlled link in which traffic control information is present within a predetermined distance from the vehicle;
      determines whether there is congestion information that begins with the controlled link based on the received traffic information; and
      provides, if there is the congestion information that begins with the controlled link, traffic congestion guidance indicating that there is traffic congestion due to traffic control.

2. The navigation apparatus according to claim 1, wherein the controller:
   determines whether there are congestion road links included in the congestion information that are connected to one another and begin with the controlled link; and determines whether any of the connected congestion road links are along a guidance route;

wherein, if any of the connected congestion road links are along the guidance route, the traffic congestion guidance indicates that the connected congestion road links along the guidance route are the traffic congestion that begins at the controlled link.

3. The navigation apparatus according to claim 1, wherein the controller:

displays the traffic congestion beginning at the controlled link on a map with an indication that the traffic congestion is caused by the controlled link.

4. The navigation apparatus according to claim 3, wherein the indication is a visual indication on the map.

5. The navigation apparatus according to claim 3, wherein the indication is an audio indication.

6. The navigation apparatus according to claim 1, wherein the controller provides guidance about a controlled link that is within a predetermined distance from the vehicle, but is not along a guidance route.

7. A navigation method for a vehicle, the method comprising the steps of:

receiving traffic information including congestion information and traffic control information;

determining whether there is a controlled link in which traffic control information is present within a predetermined distance from the vehicle;

determining whether there is congestion information that begins with the controlled link based on the received traffic information; and providing, if there is the congestion information that begins with the controlled link, traffic congestion guidance indicating that there is traffic congestion due to traffic control.

8. The navigation method according to claim 7, further comprising the steps of:

determining whether there are congestion road links included in the congestion information that are connected to one another and begin with the controlled link; and determining whether any of the connected congestion road links are along a guidance route;

wherein, if any of the connected congestion road links are along the guidance route, the traffic congestion guidance indicates that the connected congestion road links along the guidance route are the traffic congestion that begins at the controlled link.

9. The navigation apparatus according to claim 7, further comprising the step of:

displaying the traffic congestion beginning at the controlled link on a map with an indication that the traffic congestion is caused by the controlled road link.

10. The navigation apparatus according to claim 9, wherein the indication is a visual indication on the map.

11. The navigation apparatus according to claim 9, wherein the indication is an audio indication.

12. The navigation apparatus according to claim 7, further comprising the step of:

providing guidance about a controlled link that is within a predetermined distance from the vehicle, but is not along a guidance route.

13. A storage medium storing a set of program instructions executable on a data processing device, the instructions usable to implement the method of claim 7.

14. A navigation apparatus for a vehicle, the apparatus comprising:

a communication portion that receives traffic information including congestion information and traffic control information; and a controller that:

determines whether there is congestion information that begins with a controlled link based on the received traffic information; and provides, if there is the congestion information that begins with the controlled link, traffic congestion guidance indicating that there is traffic congestion due to traffic control.

* * * * *